Fig. 1. A = 1,1'-DIETHYL-2,2'-CYANINE IODIDE
B = 1,1'-DIETHYL-2,2'-CYANINE IODIDE WITH 6-DIMETHYLAMINO-1-METHYLBENZOTHIAZOLE.

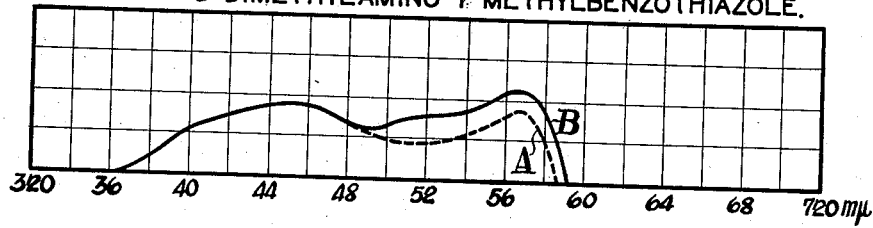

Fig. 2. C = 2-METHYL-1'-ETHYLTHIA-2'-CYANINE IODIDE
D = 2-METHYL-1'-ETHYLTHIA-2'-CYANINE IODIDE WITH 6-DIMETHYLAMINOQUINALDINE.

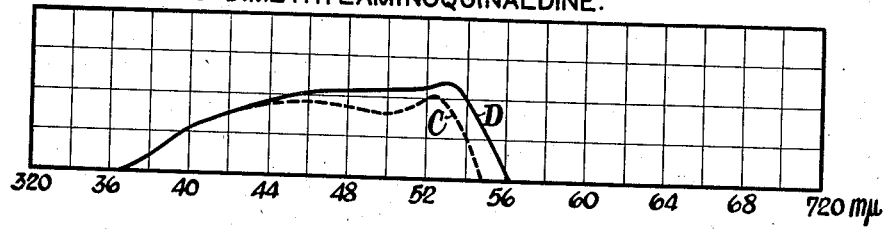

Fig. 3. E = 1,1'-DIETHYL-2,2'-CARBOCYANINE IODIDE
F = 1,1'-DIETHYL-2,2'-CARBOCYANINE IODIDE WITH 6-DIMETHYLAMINOQUINALDINE.

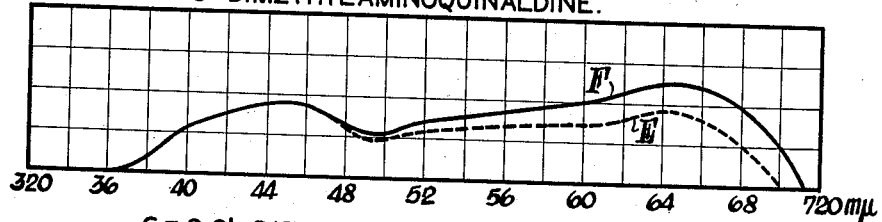

Fig. 4. G = 2,2'-DIETHYL-3,4,3',4',-DIBENZOTHIACARBOCYANINE IODIDE.
H = 2,2'-DIETHYL-3,4,3',4',-DIBENZOTHIACARBOCYANINE IODIDE WITH 6-DIMETHYLAMINOQUINALDINE.

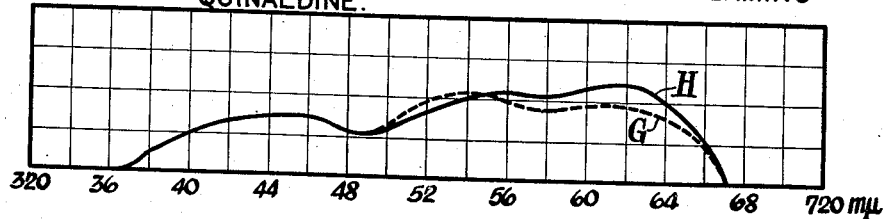

Burt H. Carroll & Edward P. Davey INVENTORS

Patented Oct. 31, 1939

2,177,635

UNITED STATES PATENT OFFICE 2,177,635

PHOTOGRAPHIC EMULSION

Burt H. Carroll, Rochester, N. Y., and Edward P. Davey, Harrow, England, assignors to Eastman Kodak Company, Rochester, N. Y., a corporation of New Jersey Application May 29, 1937, Serial No. 145,534

19 Claims. (Cl. 95—7)

This invention relates to sensitized photographic emulsions and more particularly to photographic emulsions, such as those of the gelatino-silver-halide type, containing one or more sensitizing materials together with one or more materials which in themselves do not materially sensitize photographic emulsions, but which, when mixed or combined with the sensitizing material, act to increase the sensitization produced by the sensitizing material alone. The sensitization produced by our combinations is always greater, in some spectral region, than the sensitization produced by the sensitizing material alone. The sensitizing materials of our combinations are substances generally referred to as dyes and more particularly as dyes of the cyanine class.

It is known in the art of making photographic emulsions that certain dyes of the cyanine class alter the sensitivity of photographic emulsions of the gelatino-silver-halide kind, when incorporated therein. It is also well known that the sensitization produced by a given dye varies with the type of emulsion in which it is incorporated. Furthermore, the sensitization of a given emulsion by a given dye may be altered by varying conditions in the emulsion, for example, the sensitization may be increased by increasing the silver ion concentration or by decreasing the hydrogen ion concentration (i. e. increasing the alkalinity) or both. Sensitization can be increased, for example, by bathing a sensitized emulsion with water or with solutions of ammonia. This process of altering the sensitization of a sensitized emulsion by increasing the silver ion concentration and/or by decreasing the hydrogen ion concentration is commonly called "hypersensitization."

More recently, it has been shown that the sensitization produced in an emulsion by a given dye can be increased by incorporating another sensitizing dye. This phenomenon has been called "supersensitization." It is a highly specific phenomenon, being found only with combinations of certain groups of dyes. Certain supersensitizing combinations of dyes are described in United States Patents 2,075,046; 2,075,047 and 2,075,048.

We have now found a new means of altering the sensitization produced in emulsions by dyes. Since the conditions in the emulsion, e. g. the hydrogen ion concentration or the silver ion concentration, undergo little or no change in our new method, we shall designate our new method as a kind of supersensitization. However, our new method is not to be confused with that described in the above patents, because instead of employing combinations of sensitizing dyes, we employ a mixture or a combination of one or more sensitizing dyes with one or more substances which in themselves have little or no sensitizing effect on the emulsions. Furthermore, our new method is more general, both with respect to the sensitizing dyes and with respect to the non-sensitizing substances. Our supersensitized emulsions are more stable than hypersensitized emulsions. We shall refer to our mixtures of sensitizing dyes and non-sensitizing substances as new combinations, although we do not mean to imply that the dyes and the non-sensitizing substances are chemically combined. The non-sensitizing substances can be referred to as the supersensitizing substances. In preparing our new supersensitized emulsions, we employ one or more simple cyanine or carbocyanine dyes, while as supersensitizing substances we employ one or more organic amino compounds, such, for example, as one or more amino heterocyclic nitrogen bases.

An object of our invention, therefore, is to provide supersensitized photographic emulsions. A further object is to provide a method of altering the sensitivity of sensitized emulsions. A further object is to provide a process for increasing the sensitivity of sensitized emulsions. A still further object is to provide a photographic element comprising supersensitized emulsions. Other more specific objects will become apparent hereinafter.

The sensitizing cyanine dyes employed in our invention, in themselves, sensitize gelatino-silver-halide emulsions to maximum sensitivity between about 400 mu. and about 720 mu. The sensitizing simple cyanine dyes employed in our invention contain at least one pyridine or at least one quinoline nucleus, such as is the case in 2, 2'-cyanine dyes, 5, 6-benzo-2, 2'-cyanine dyes, 2, 4'-cyanine dyes, 4, 4'-cyanine dyes, 2, 2'-pyridocyanine dyes, 4, 4'-pyridocyanine dyes, thia-2'-cyanine dyes, benzothia-2'-cyanine dyes, selena-2'-cyanine dyes, thiazolo-2'-cyanine dyes, thia-4'-cyanine dyes, selena-4'-cyanine dyes, thiazolo-4'-cyanine dyes, selenazolo-2'-cyanine dyes, benzothia-4'-cyanine dyes and thia-2'-pyridocyanine dyes for example. The above recited simple cyanine dyes, all of which contain at least one pyridine or at least one quinoline nucleus, belong to the following four classes of dyes, to wit: 2'-cyanine or pseudocyanine dyes, 4'-cyanine or isocyanine dyes, 2'-pyridocyanine dyes and 4'-pyridocyanine dyes. The sensitizing carbocyanine dyes employed in our invention contain two heterocyclic nuclei linked through their alpha positions by the trimethenyl chain. The heterocyclic nuclei in the carbocyanine dyes employed in our invention are of the group— quinoline nuclei, such as unsubstituted quinoline, 5-methylquinoline or 5, 6-benzoquinoline nuclei for example, thiazoles, such as 4-phenylthiazole, 4-methylthiazole, 4, 5-diphenylthiazole, unsubstituted thiazole, benzothiazole, α-naphthothiazole or β-naphthothiazole nuclei for example, oxazole nuclei, such as benzoxazole, α-naphthoxazole or β-naphthoxazole for example and selenazole nuclei, such as benzoselenazole for example.

While there is more than one manner of formulating and naming the materials which we employ in practicing our invention, it is believed that the formulas, systems of numbering and nomenclature used herein are in accordance with those used during the development of the respective arts to their present stages. By the term "simple cyanine dye," we mean a cyanine dye in which the two heterocyclic nuclei are linked or joined together by a single methenyl group. Simple cyanine dyes can be represented by the following general formulas:

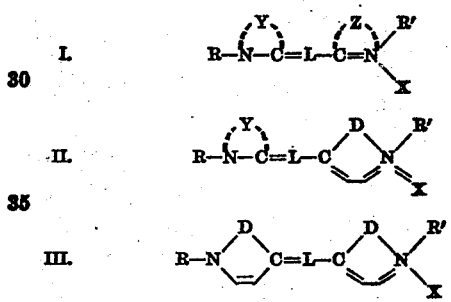

wherein D represents a divalent organic group, such as a vinylene or a phenylene group, L represents a methylene group, R and R' represent organic groups, particularly alkyl groups, X represents an acid radical and Y and Z each represent the non-metallic atoms necessary to complete a heterocyclic nucleus.

By the term "carbocyanine dye", we mean a cyanine dye in which the two heterocyclic nuclei are linked or joined together by a trimethenyl chain. Carbocyanine dyes, of the kind where the two heterocyclic nuclei are linked by a trimethenyl chain through their alpha positions, can be represented by the following general formulas:

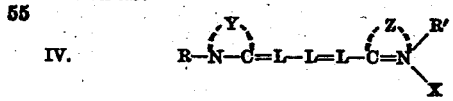

wherein L, R, R', X, Y and Z have the values set forth under formulas I, II and III above. Carbocyanine dyes represented by formula IV can be called α, α'-carbocyanine dyes.

By the term "organic amino compounds", we mean an organic compound containing an amino group which can be unsubstituted or substituted as for example by alkyl groups or acyl groups. Cyclic organic amino compounds particularly of the aromatic series are especially useful. Heterocyclic nitrogen bases containing an amino group are particularly advantageously employed in practicing our invention.

Among the simple cyanine dyes which can be employed in practicing our invention are the following:

The 2,2'-cyanine dyes which can be represented by the following formula:

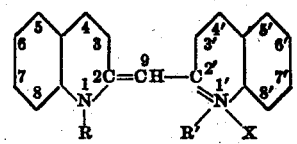

The thia-2'-cyanine dyes which can be represented by the following formula:

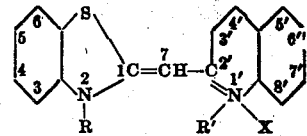

The selena-2'-cyanine dyes which can be represented by the following formula:

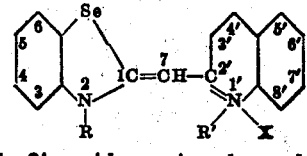

The thia-2'-pyridocyanine dyes which can be represented by the following general formula:

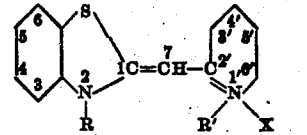

The benzothia-2'-cyanine dyes which can be represented by the following general formula:

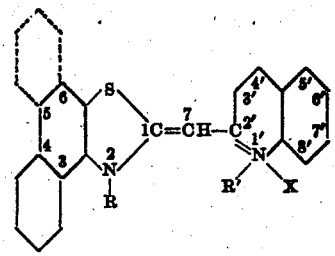

The benzo-2,2'-cyanine dyes which can be represented by the following general formula:

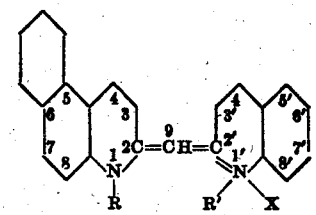

The thiazolo-2'-cyanine dyes which can be represented by the following general formula:

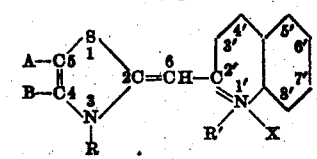

The thia-4'-cyanine dyes which can be represented by the following general formula:

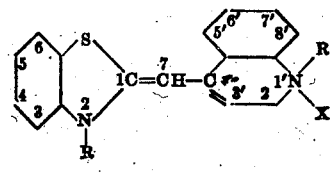

The selena-4'-cyanine dyes which can be represented by the following general formula:

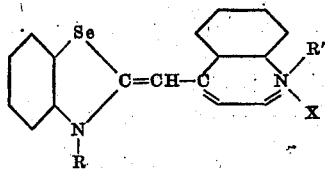

The thiazolo-4'-cyanine dyes which can be represented by the following general formula:

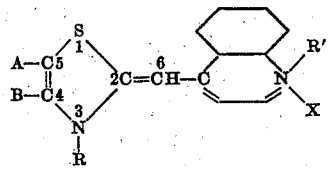

The 4,4'-cyanine dyes which can be represented by the following general formula:

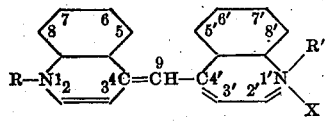

The 4,4'-pyridocyanine dyes which can be represented by the following general formula:

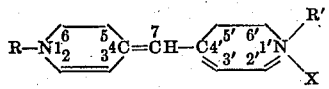

The 2,4'-cyanine dyes which can be represented by the following general formula:

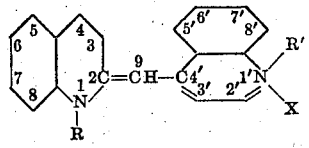

The 2,2'-pyridocyanine dyes which can be prepared represented by the following formula:

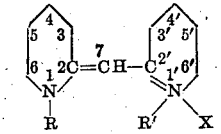

In the above formulas of simple cyanine dyes, A and B represent hydrogen, alkyl or aryl groups, R and R' represent alkyl groups and X represents an acid radical. In practicing our invention, we have found it advantageous to employ the dye-halides, particularly the dye-iodides (where X represents iodine). However, other dye-salts can be employed, such, for example, as the chlorides, bromides, perchlorates, alkylsulfates or p-toluenesulfonates. We have further found it advantageous to employ simple cyanine dyes where R and R' represent an alkyl group of from one to four carbon atoms, such as methyl, ethyl, isobutyl, n-propyl or β-hydroxyethyl, for example. The dyes wherein R and R' represent an alkyl group of two carbon atoms are particularly useful in practicing our invention. The simple cyanine dyes can be substituted in their nuclei with simple substituents which do not interfere with sensitizing properties, such, for example, as chloro, bromo, alkyl, alkoxy, amino or the like. As shown in the above formulas, dyes having a fused-on nucleus, for example a benzene ring as in the case of benzothia-2'-cyanine dyes, can be employed.

The above formulas of representative types of simple cyanine dyes are not intended to limit our invention, as there are still other well known simple cyanine dyes not depicted above. However, the foregoing will serve to instruct those skilled in the art as to which of the simple cyanine dyes can advantageously be employed in practicing our invention.

The methods of preparing the different simple cyanine dyes are well known and described in various patents and printed publications. However, the following will aid those skilled in the art in quickly locating the available information.

2,2'-cyanine dyes can be prepared as described by Hamer in J. Chem. Soc., page 206 et seq. (1928). 2,2'-pyridocyanine dyes can be prepared as described by Brooker and Keyes in Jour. Am. Chem. Soc., vol. 57, page 2488 et seq. (1935). Thia-2'-cyanine dyes and 5,6-benzo-2,2'-cyanine dyes can be prepared as described by Hamer in J. Chem. Soc., page 206 et seq. (1928). Selena-2'-cyanine dyes can be prepared as described by Brooker and Keyes in Jour. Am. Chem. Soc., vol. 57, page 2488 et seq. (1935). 7-alkyl-thia-2' and 4'-cyanine dyes can be prepared as described in U. S. Patent 2,060,023. Benzothia-2'-cyanine dyes can be prepared as described by Hamer in J. Chem. Soc., page 2598 et seq. (1929). Thiazolo-2'-cyanine and selelazolo-2'-cyanine dyes can be prepared as described in U. S. Patent 1,969,446 (see also British Patent 408,570 and French Patent 757,768). 2,4'-cyanine dyes can be prepared as described by Mills and Pope in Phot. J., page 183 et seq. (1920). 4,4'-cyanine dyes can be prepared as described by Hoogewerff and Van Dorp in Rec. vol. 3, page 337 et seq. (1884). Thia-4'-cyanine dyes can be prepared as described by Braunholtz and Mills in J. Chem. Soc., vol. 121, page 2004 et seq. (1922).

Thiazolo-4'-cyanine dyes can be prepared as illustrated below.

3.3 g. (1 mol.) of 1-methyl-4-phenylthiazole ethiodide and 5.7 g. (2 mol.) of quinoline ethiodide were dispersed in 25 cc. of absolute ethyl alcohol containing 1.3 g. of 85% potassium hydroxide. The whole was refluxed for about ten minutes. The dye separated from the chilled reaction mixture. It was washed with ethyl alcohol, acetone and then water and finally recrystallized from methyl alcohol. It was obtained as reddish needles.

4,4'-pyridocyanine dyes can be prepared as illustrated below:

17.6 g. (3 mol.) of γ-picoline etho-p-toluenesulfonate, 8 g. (1 mol.) of 4-phenylmercaptopyridine ethiodide, 15 cc. of n-propyl alcohol and 4.2 g. (2.2 mol.) of triethylamine were refluxed for about 90 minutes. The dye was precipitated from the reaction mixture by adding diethyl ether. The precipitate was treated with 2.5 g. of sodium perchlorate dissolved in 3 cc. of water. The dye, as the perchlorate, separated from the sodium perchlorate reaction mixture after carefully concentrating the reaction mixture. The dye was washed with diethyl ether and acetone to remove some colorless material and was finally twice recrystallized from a 50—50 (volume 1) mixture of acetone and water. The perchlorate dye was obtained as beautiful brown-orange needles having a bright greenish-golden reflex and melting at 196 to 198° C. with decomposition. Employing the method-p-toluenesulfonate instead of the etho, the 1-ethyl-1'-methyl dye is obtained.

The 4-phenylmercaptopyridine was prepared as follows:

15.5 g. (1 mol.) of 4-chloropyridine were added to 22 g. (1 mol.) of phenyl mercaptan cooled in a freezing mixture. A vigorous reaction ensued and the reaction mixture set to a solid mass which was then heated at 100° C. for about 10 minutes. The solid so obtained was the hydrochloride of 4-phenylmercaptopyridine. It was washed with ether and the free base generated with ammonia. The base was extracted from the ammonia reaction mixture with diethyl ether and purified by distillation. It boiled at 128° to 129° C. at 2 mm. of mercury pressure. It was converted into its ethiodide by heating one molecular proportion with one molecular proportion of ethyl iodide in a sealed tube at about 100° C. for about 17 hours. The solid obtained was washed with diethyl ether and recrystallized from acetone. It melted at 178 to 180° C. with decomposition. The methiodide can be formed more readily by merely refluxing with methyl iodide for about 30 minutes. The methiodide melted at 174 to 176° C.

Selena-4'-cyanine dyes can be prepared as illustrated below:

2 g. (1 mol.) of 1-methylbenzoselenazole ethiodide and 5.7 g. (2 mol.) of quinoline ethiodide were dispersed in 30 cc. of absolute ethyl alcohol containing 1.3 g. of 85% potassium hydroxide. The whole was refluxed for about 10 minutes. The reaction mixture was cooled when the dye separated. The dye was filtered off, washed with water, and then with acetone. It was recrystallized from methyl alcohol and obtained as red crystals.

Acenaphthothiazolo-2'-cyanine dyes can be prepared as illustrated below:

2-methyl-4,5(3,2)acenaphthothiazole (1.1 g., 1 mol.) and ethyl-p-toluenesulfonate (1 g., 1 mol.) were heated in an oil bath at 130° to 140° C. for about 65 hours. The brownish viscous mass of quaternary salt was dissolved in 20 cc. of absolute ethyl alcohol and 2-iodoquinoline ethiodide (2 g., 1 mol.) and triethylamine (1 g. 2 mol.) were added. The mixture was refluxed on a steam bath for about 30 minutes. The dye separated from cooled reaction mixture and was recrystallized from methyl alcohol. The purified dye was obtained as a dull red powder melting at 277° to 279° C. with decomposition.

2-methyl-4,5(3,2)acenaphthothiazole from 3-aminoacenaphthene by acetylation thereof with acetic anhydride. 85 g. (1 mol.) of 3-aminoacenaphthene and 51.2 g. (1 mol.) of acetic anhydride in 100 cc. glacial acetic acid were heated on the steam bath for an hour. The acetylated product separated from the chilled reaction mixture. The acetylated product, 10.5 g. (1 mol.) was suspended in 200 cc. of dry toluene and heated to 120° to 125° C. 5.6 g. (0.5 mol.) of phosphorous pentasulfide was added with stirring, and the mixture heated for 20 minutes longer. The toluene solution was decanted and the tarry residue was treated with an ice cold 25 cc. of 40% sodium hydroxide solution. The aqueous layer was treated with ice cold glacial acetic acid to precipitate the thioacetyl compound. The thioacetyl compound was dissolved in dilute sodium hydroxide and potassium ferricyanide solution added in excess. A light-brownish oil separated. The oil was taken up in ether, dried over anhydrous potassium carbonate and finally distilled. 2-methyl-4,5(3,2)acenaphthothiazole was obtained as a liquid boiling at 194° to 200° C. at 3 mm. of mercury and solidifying on cooling. It melted at 96° to 97° C. Acenaphthothiazole-2'-cyanine dyes can be employed in practicing our invention.

Among the carbocyanine dyes which can be employed in practicing our invention are the following:

The 2,2'-carbocyanine dyes which can be represented by the following general formula:

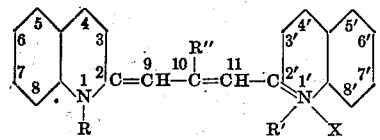

The thiacarbocyanine dyes which can be represented by the following general formula:

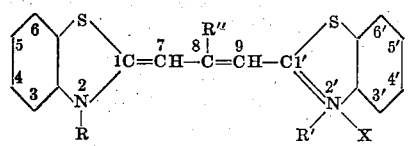

The dibenzothiacarbocyanine dyes which can be represented by the following general formula:

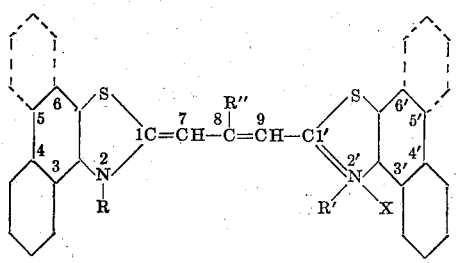

The oxa- and dibenzoxacarbocyanine dyes which can be represented by the following general formula:

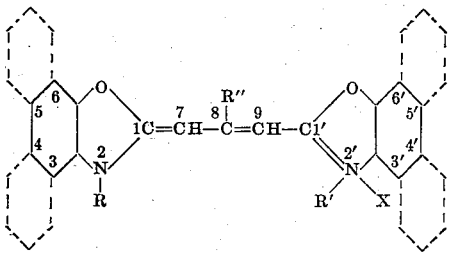

The selenacarbocyanine dyes which can be represented by the following general formula:

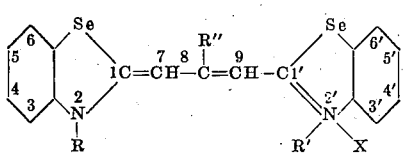

The oxathiacarbocyanine dyes which can be represented by the following general formula:

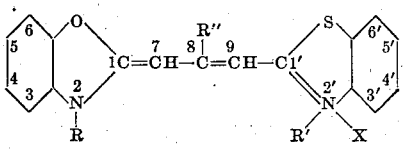

The oxabenzothiacarbocyanine dyes which can be represented by the following general formula:

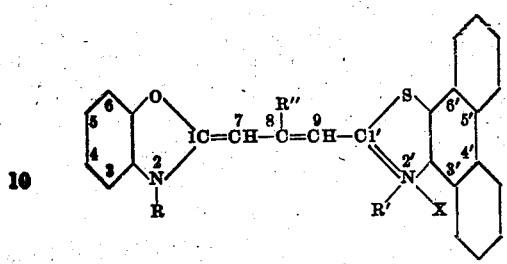

The benzoxathiacarbocyanine dyes which can be represented by the following general formula:

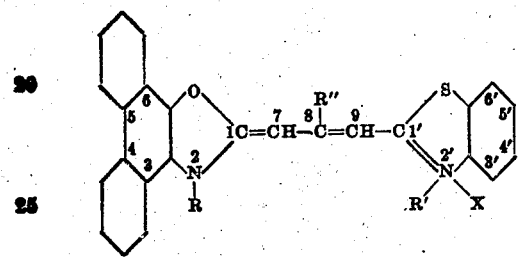

The thiabenzothiacarbocyanine dyes which can be represented by the following general formula:

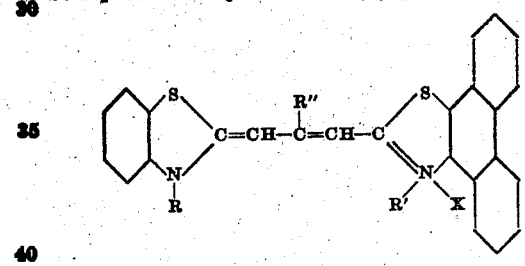

The thiazolocarbocyanine dyes which can be represented by the following general formula:

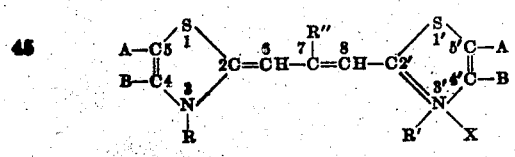

The oxathiazolocarbocyanine dyes which can be represented by the following general formula:

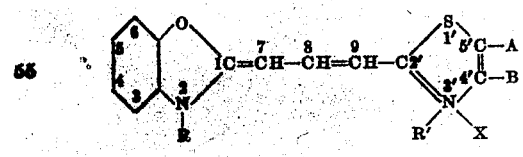

The oxaselenacarbocyanine dyes which can be represented by the following general formula:

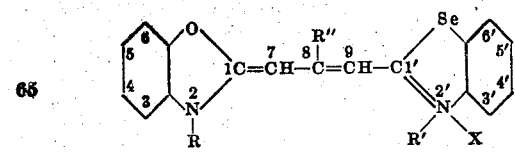

In the above formulas of carbocyanine dyes, A and B represent hydrogen, alkyl or aryl groups; R and R' represent alkyl groups; R'' represents hydrogen, alkyl or aryl groups; and X represents an acid radical. In practicing our invention, we have found it advantageous to employ the dye-halides, particularly the dye-iodides (where X represents iodine). However, other dye-salts can be employed, such, for example, as the chlorides, bromides, perchlorates, alkylsulfates, or p-toluenesulfonates. We have further found it advantageous to employ carbocyanine dyes where R and R' represent an alkyl group of from one to four carbon atoms, such as methyl, ethyl, isobutyl, normal propyl or β-hydroxyethyl, for example. The dyes wherein R and R' represent an alkyl group of two carbon atoms are particularly useful in practicing our invention. The carbocyanine dyes can be substituted in their nuclei with simple substituents which do not interfere with sensitizing properties, such, for example, as chloro, bromo, alkyl, alkoxy, amino or the like. As shown in the above formulas, dyes having a fused-on nucleus, for example, a benzene ring as in the case of dibenzothiacarbocyanine dyes, can be employed.

The above formulas of representative types of carbocyanine dyes are not intended to limit our invention, as there are still other well known carbocyanine dyes not depicted above. However, the foregoing will serve to instruct those skilled in the art as to which of the simple cyanine dyes can advantageously be employed in practicing our invention.

The methods of preparing the different carbocyanine dyes are well known and described in various patents and printed publications. However, the following will aid those skilled in the art in quickly locating the available information.

2,2'-carbocyanine, oxacarbocyanine and thiacarbocyanine dyes can be prepared as described by Hamer in J. Chem. Soc., page 2796 et seq. (1927). Selenacarbocyanine dyes can be prepared as described by Clark in J. Chem. Soc., page 2313 et seq. (1928). Dibenzothiacarbocyanine dyes can be prepared as described in U. S. Patent 1,969,444. Dibenzoxacarbocyanine dyes can be prepared as described in U. S. Patent 1,939,201. 5,6,5',6'-dibenzo-2,2'-carbocyanine dyes can be prepared as described by Mees and Gutekunst in Ind. Eng. Chem., vol. 14, page 1060 et seq. (1922). Thiazolocarbocyanine dyes can be prepared as described by Fisher and Hamer in J. Chem. Soc., page 2502 et seq. (1930). Thiacarbocyanine dyes containing a substituent at the central carbon atom of the trimethenyl chain can be prepared as described in U. S. Patents, 1,934,657; 1,934,658; and 1,934,659. Dibenzothiacarbocyanine dye containing a substituent at the central carbon atom of the trimethenyl chain can be prepared as described in U. S. Patent 1,969,444. Selenacarbocyanine dyes containing a substituent at the central carbon atom of the trimethenyl chain can be prepared as described in U. S. Patent 1,990,681. Unsymmetrical carbocyanine dyes containing a substituent at the central carbon atom of the trimethenyl chain can be prepared as described in French Patent 808,598. Unsymmetrical carbocyanine dyes, particularly those devoid of substituents at the central carbon atom of the trimethenyl chain, can be prepared by reacting a β-anilinovinyl derivative of a cyclammonium quaternary salt with another cyclammonium quaternary salt containing a reactive alkyl group, e. g., a reactive methyl group. The β-acetanilidovinyl derivatives are advantageously employed. The method is known in the art and the following examples are illustrative:

To prepare oxa-, thia-, and selena-2'-carbocyanine dyes which can be employed in practicing our invention and which can be represented by the following general formula:

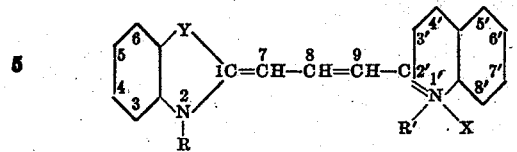

wherein Y represents oxygen, sulfur or selenium, R and R' represent alkyl groups and X represents an acid radical, a β-anilinovinyl derivative of quinoline is first prepared by fusing an intimate mixture one molecular proportion of quinaldine ethiodide with one molecular proportion of diphenyl-formamidine at 150° C. to about 180° C. for about 10 minutes with stirring. The cooled reaction mixture was ground with acetone, filtered, and recrystallized from methyl alcohol. One part of the β-anilinovinyl derivative and one part of the ethiodide of 1-methyl-benzoxazole, 1-methylbenzothiazole or 1-methylbenzoselenozole are dispersed in about two parts of pyridine and the whole is refluxed for from about 10 to about 20 minutes. The dye separates from the chilled reaction mixture. Precipitation of the dye is facilitated by addition of diethyl ether. The dyes can be washed with acetone and recrystallized from methyl alcohol.

Oxathiacarbocyanines can be prepared by first reacting 1-methylbenzoxazole ethiodide with diphenylformamidine in acetic anhydride at a refluxing temperature for about 20 minutes. The β-acetanilido compound separates upon cooling and is washed with acetone. One part of the β-acetanilidovinyl compound and one part of 1-methylbenzothiazole ethiodide are refluxed in pyridine solution for about 20 minutes. The dye separates from the chilled reaction mixture. Diethyl ether facilitates separation. The dye can be recrystallized from methyl alcohol. To prepare oxabenzothiacarbocyanine dyes the 1-methylbenzothiazole ethiodide is replaced by 1-methyl-α-naphthothiazole or 2-methyl-β-naphthothiazole ethiodides. Instead of forming the dyes in pyridine, the β-anilinovinyl compounds can be reacted with cyclammonium quaternary salts in acetic anhydride containing sodium acetate to bind the elements of acid eliminated during dye formation.

Among the organic amino compounds which can be employed in practicing our invention are the following:

The aminoquinolines, for example:

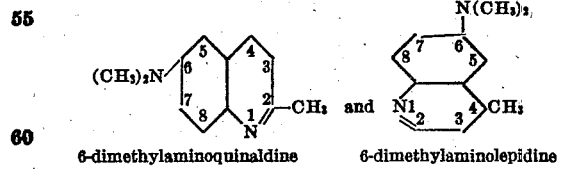

6-dimethylaminoquinaldine    6-dimethylaminolepidine

The aminobenzothiazoles, for example:

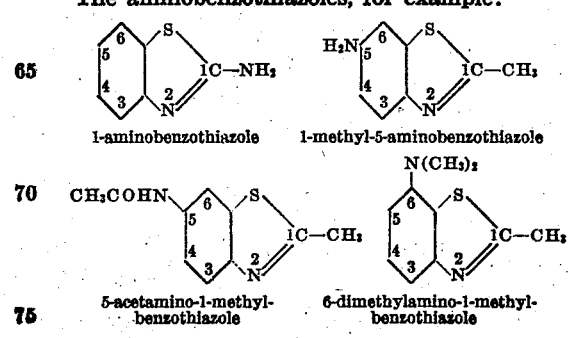

1-aminobenzothiazole    1-methyl-5-aminobenzothiazole 5-acetamino-1-methyl-benzothiazole    6-dimethylamino-1-methyl-benzothiazole

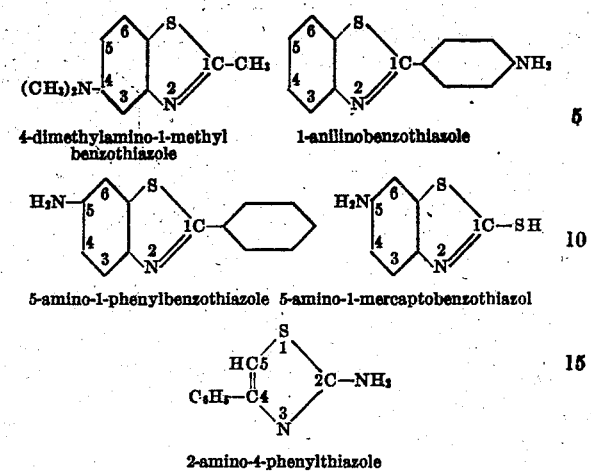

4-dimethylamino-1-methyl benzothiazole    1-anilinobenzothiazole 5-amino-1-phenylbenzothiazole    5-amino-1-mercaptobenzothiazol 2-amino-4-phenylthiazole Still other amino heterocyclic nitrogen bases are: 2-amino-4-methylbenzothiazole, 4-amino-1-methyl-β-naphthothiazole, 1-aminothiazole, 8-aminoquinoline, 2-aminopyridine, 1-aminobenzoxazole, and μ-amino-β-naphthothiazole for example. The heterocyclic nitrogen base can have more than one amino group substituent. The amino group is advantageously on the nucleus, as in 6-dimethylaminoquinoline, or 4-dimethylamino-1-methylbenzothiazole for example. Heterocyclic nitrogen bases containing dialkylamino groups, particularly dimethyl-amino, are especially useful. The position of the amino group substituent appears to alter the supersensitizing properties of the amino heterocyclic nitrogen bases. In the benzazole bases, i. e. benzathiazole and benzoxazole for example, an amino group, particularly a dimethylamino group, in the 6-position gives rise to strongly supersensitizing amino heterocyclic nitrogen bases. We have found 6-dialkylaminobenzathiazoles and 6-dialkylaminoquinolines are very strong supersensitizers. In general, we have found that aminoquinolines and aminobenzazoles, particularly aminobenzothiazoles, especially the dialkylamino compounds are advantageously employed in practicing our invention.

The amino heterocyclic nitrogen bases are well known compounds. The preparation thereof is adequately described in patents and printed publications reference to which can be found in the standard handbooks of Organic Chemistry such as Beilstein's Handbuch der organischen Chemie, Richter-Anschütz's Chemie der Kohlenstoff-Verbendungen and Meyer-Jacobson's Lehrbuch der organischen Chemie.

The objects of our invention can be accomplished by incorporating one or more sensitizing simple cyanine or carbocyanine dyes, together with one or more organic amino compounds in a photographic emulsion. Our invention is particularly directed to the ordinarily employed gelatino-silver-halide emulsions. However, our supersensitizing combinations can be employed in emulsions in which the carrier is other than gelatin, for example, a resinous substance of cellulosic derivative which has substantially no deleterious effect on the light-sensitive materials. As silver halide emulsions, we include such emulsions as are commonly employed in the art, but more particularly the customarily employed silver chloride and silver bromide emulsions. The silver chloride and silver bromide emulsions may contain other salts which may be light sensitive. By way of illustration, the herein described supersensitized emulsions were prepared employing an ordinary gelatino-silver-bromide emulsion of ordinary concentration (approximately 40 g. of silver halide per liter). The dyes were generally employed in concentrations of from 10 to 20 mg. of dye per liter of emulsion, but can be employed in concentrations several times greater or less than that. The supersensitizing substance, i. e. the organic amino compound was generally employed in concentrations of about 20 mg. per liter of emulsion, but can be employed in concentrations several times greater or less than that. The ratio of concentration of dye to the concentration of supersensitizing substance can vary widely from 10:1 to 1:100, for example. The most favorable conditions for supersensitization of the desired magnitude must be determined by applying the ordinary observations and tests common in the photographic emulsion art. The manner of applying such observations and tests will be apparent to those skilled in the art upon a complete perusal of these specifications.

The methods of incorporating dyes in emulsions are simple and well known to those skilled in the art. In practicing our invention, the dyes of our combinations can be incorporated in the emulsions separately or together with the supersensitizing substances. It is convenient to first add the dyes in the form of solutions in appropriate solvents. Then the supersensitizing substance can be added, advantageously in the form of a solution. The solvents employed must, of course, be compatible with the emulsions, substantially free from any deleterious effect on the light-sensitive materials and capable of dissolving the dye or supersensitizing substances. Methanol has proven satisfactory as a solvent for both the dyes and the supersensitizing substances in practicing our invention. Acetone can also be employed. The dyes and supersensitizing substances can advantageously be incorporated in the finished, washed emulsion and should be uniformly distributed throughout the emulsion. The following procedure is satisfactory: A stock solution of the dye or supersensitizing substance is prepared by dissolving the dye or supersensitizing substance in a suitable solvent, such as methyl or ethyl alcohol or acetone. Then, to one liter of a flowable gelatino-silver-halide emulsion, an amount of the so-prepared stock solution, diluted somewhat with water, if desired, containing the desired amount of dye or supersensitizing substance is slowly added with stirring. Stirring is continued until the dye or supersensitizing substance is thoroughly incorporated. The supersensitized emulsion can then be coated out upon a suitable support, such as glass, cellulose derivative, resinous material, paper or the like, to a suitable thickness and allowed to dry. The details of such coating methods are well known to those skilled in the art.

The amount of dye or supersensitizing substance actually incorporated will, of course, vary from dye to dye and supersensitizing substance to supersensitizing substance, according to the emulsion employed and according to the supersensitizing effect desired. The regulation and adoption of the most economical and useful proportions will be apparent to those skilled in the emulsion art upon making the ordinary observations and tests customarily employed in the art.

Accordingly, the foregoing procedures and proportions are to be regarded only as illustrative.

Clearly our invention is directed to any emulsion containing a combination of dye and supersensitizing substance whereby a supersensitizing effect is obtained.

The following combinations or mixtures of dyes and substantially non-sensitizing organic amino compounds are illustrative of combinations which can advantageously be employed in practicing our invention. These illustrations are not intended to be limiting.

A. 6 - dimethylamino - 1 - methylbenzothiazole with one or more of the following dyes:

1,1'-diethyl-2,2'-cyanine iodide, 2-methyl-1'-ethylthia - 2' - cyanine iodide, 2,1' - diethyl - 4 - chlorthia-2'-cyanine iodide, 2,1'-diethyl-3,4-benzthia - 2' - cyanine iodide, 2,1' - diethyl - 6'-methyl-3,4-benzthia-2'-cyanine iodide, 3,1'-diethyl-4-phenyloxazolo-2'-cyanine iodide, 2,1'-diethylthia-2'-carbocyanine iodide, 2,2'-dimethyl-8-ethylthiacarbocyanine iodide, 2,2'-diethyl-8-methyl - 3,4,3',4' - dibenzthiacarbocyanine chloride, 2,2',8-triethyl-4,4'-dichlorothiacarbocyanine iodide, 2,2',8-triethylselenacarbocyanine iodide, 2,2'-diethyl-8-methyl-3',4'-benzoxathiacarbocyanine iodide, 1,1'-diethyl-2,2'-carbocyanine chloride, 2,2' - diethyloxacarbocyanine iodide.

B. 6-dimethylaminoquinaldine with one or more of the following dyes:

1,1'-diethyl-2,2'-cyanine iodide, 2-methyl-1'-ethylthia - 2' - cyanine iodide, 2,1' - diethyl-4-chlorothia-2'-cyanine iodide, 2,1'-diethyl-3,4-benzthia - 2' - cyanine iodide, 2,1' - diethyl-6'-methyl-3,4-benzthia-2'-cyanine iodide, 2,1'-diethylthia-2'-carbocyanine iodide, 2,2' - diethyl-3,4,3',4'-dibenzothiacarbocyanine iodide, 2,2'-diethyl-8-methylthiacarbocyanine iodide, 2,2'-dimethyl-8-ethylthiacarbocyanine iodide, 2,2'-diethyl -8- methyl-3,4,3',4'-dibenzthiacarbocyanine chloride, 2,2',8-triethyl-4,4'-dichlorothiacarbocyanine iodide, 2,2' - diethyl - 8 - methyl - 3',4'-benzoxathiacarbocyanine iodide, 1,1'-diethyl-2,2'-carbocyanine chloride, 2,2' - diethyloxacarbocyanine iodide, 2,2' - diethylthiacarbocyanine iodide.

C. 6-dimethylaminolepidine with one or more of the following dyes:

1,1'-diethyl-2,2'-cyanine iodide, 2,2',8-triethyl-4,4'-chlorothiacarbocyanine iodide, 2,2'-dimethyl-8-ethylthiacarbocyanine iodide.

D. 1-aminobenzothiazole with one or more of the following dyes:

1,1'-diethyl-2,2'-cyanine iodide, 2,2',8-triethyl-4,4' - dichlorothiacarbocyanine iodide, 2,2'-dimethyl-8-ethylthiacarbocyanine iodide.

E. One or more of the following amino heterocyclic nitrogen bases—

5-amino-1-methylbenzothiazole, 5-acetamino-1 - methylbenzothiazole, 4 - dimethylamino - 1-methylbenzothiazole, 2-amino - 4 - methylbenzothiazole, 1 - anilinobenzothiazole, 5 - amino - 1-phenylbenzothiazole, 5-amino-1-mercaptobenzothiazole— with one or more of the following dyes:

1,1'-diethyl-2,2'-cyanine iodide, 2,2',8-triethyl-4,4' - dichlorothiacarbocyanine iodide, 2,2'-dimethyl-8-ethylthiacarbocyanine iodide.

The accompanying drawing is by way of illustration and depicts the supersensitizing effect in four of our new combinations. Each figure of the drawing is a diagrammatic reproduction of two spectrograms showing first, the sensitivity of a silver bromide emulsion containing a simple cyanine or carbocyanine dye (represented by the dotted line in each figure) and showing second, the sensitivity of the same silver bromide emulsion containing a mixture or combination of the said simple cyanine or carbocyanine dye with an organic amino compound (represented by the solid line in each figure). The supersensitizing effect is apparent from the figures.

In Fig. 1, curve A represents the sensitivity of an ordinary gelatino-silver-bromide emulsion containing 1,1'-diethyl-2,2'-cyanine iodide in a concentration of about 15 mg. per liter of emulsion. Curve B represents the sensitivity of the same emulsion containing 1,1'-diethyl-2,2'-cyanine iodide in a concentration of about 15 mg. per liter of emulsion and containing 6-dimethylamino-1-methylbenzothiazole in a concentration of about 10 mg. per liter of emulsion. The increase in green sensitivity is about 400%.

In Fig. 2, curve C represents the sensitivity of an ordinary gelatino-silver-bromide emulsion containing 2-methyl-1'-ethylthia-2'-cyanine iodide in a concentration of about 15 mg. per liter of emulsion. Curve D represents the sensitivity of the same emulsion containing 2-methyl-1'-ethylthia-2'-cyanine iodide in a concentration of about 15 mg. per liter and containing 6-dimethylaminoquinaldine in a concentration of about 40 mg. per liter of emulsion. The increase in green sensitivity is about 280%.

In Fig. 3, curve E represents the sensitivity of an ordinary gelatino-silver-bromide emulsion containing 1,1'-diethyl-2,2'-carbocyanine iodide in a concentration of about 10 mg. per liter of emulsion. Curve F represents the sensitivity of the same emulsion containing 1,1'-diethyl-2,2'-carbocyanine iodide in a concentration of about 10 mg. per liter of emulsion and containing 6-dimethylaminoquinaldine in a concentration of about 40 mg. per liter of emulsion. The increase in red sensitivity is about 100%.

In Fig. 4, curve G represents the sensitivity of an ordinary gelatino-silver-bromide emulsion containing 2,2'-diethyl-8-methyl-3,4,3',4'-dibenzothiacarbocyanine iodide in a concentration of about 10 mg. per liter of emulsion. Curve H represents the sensitivity of the same emulsion containing 2,2'-diethyl-8-methyl-3,4,3',4'-dibenzothiacarbocyanine iodide in a concentration of about 10 mg. per liter of emulsion and containing 6-dimethylaminoquinaldine in a concentration of 40 mg. per liter of emulsion. The increase in red sensitivity is about 100%.

The spectrograms corresponding to the figures of the accompanying drawing were made in a wedge spectrograph. Each horizontal line represents an incident light intensity of about one-tenth of that of the line below it. The spectrograms with and without the supersensitizing substance were made from plates coated from the same batch of emulsion, dried and processed together.

Still further illustrations depicting diagrammatically the supersensitizing effects attainable by practicing our invention could be given, but the foregoing will suffice to teach those skilled in the art the manner of practicing our invention and the principles of sensitizing photographic emulsions with our supersensitizing combinations.

We understand the term "amino group" to include unsubstituted amino groups as well as substituted amino groups, such as monoalkylamino, dialkylamino or acylated amino groups.

What we claim as our invention and desire to be secured by Letters Patent of the United States is:

1. A photographic silver halide emulsion containing a supersensitizing combination of at least one non-sensitizing heterocyclic nitrogen base containing an amino group, the nitrogen atom of which amino group is not one of the nuclear atoms in the heterocyclic ring of the heterocyclic nitrogen base, together with at least one sensitizing cyanine dye selected from the group consisting of 2'-cyanine dyes, 4'-cyanine dyes, 2'-pyridocyanine dyes, 4'-pyridocyanine dyes and α,α'-carbocyanine dyes.

2. A photographic gelatino-silver-halide emulsion containing a supersensitizing combination of at least one non-sensitizing heterocyclic nitrogen base containing an amino group, the nitrogen atom of which amino group is not one of the nuclear atoms in the heterocyclic ring of the heterocyclic nitrogen base, together with at least one sensitizing cyanine dye selected from the group consisting of 2'-cyanine dyes, 4'-cyanine dyes, 2'-pyridocyanine dyes, 4'-pyridocyanine dyes and α,α'-carbocyanine dyes.

3. A photographic gelatino-silver-halide emulsion containing a supersensitizing combination of at least one sensitizing heterocyclic nitrogen base containing an amino group, the nitrogen atom of of which amino group is not one of the nuclear atoms in the heterocyclic ring of the heterocyclic nitrogen base, together with at least one sensitizing simple cyanine dye selected from the group consisting of 2'-cyanine dyes, 4'-cyanine dyes, 2'-pyridocyanine dyes and 4'-pyridocyanine dyes.

4. A photographic gelatino-silver-halide emulsion containing a supersensitizing combination of at least one non-sensitizing heterocyclic nitrogen base containing an amino group, the nitrogen atom of which amino group is not one of the nuclear atoms in the heterocyclic ring of the heterocyclic nitrogen base, together with at least one sensitizing α,α'-carbocyanine dye.

5. A photographic gelatino-silver-halide emulsion containing a supersensitizing combination of at least one non-sensitizing heterocyclic nitrogen base containing an amino group, the nitrogen atom of which amino group is not one of the nuclear atoms in the heterocyclic ring of the heterocyclic nitrogen base, together with at least one sensitizing pseudo-cyanine dye.

6. A photographic gelatino-silver-halide emulsion containing a supersensitizing combination of at least one non-sensitizing heterocyclic nitrogen base containing an amino group, the nitrogen atom of which amino group is not one of the nuclear atoms in the heterocyclic ring of the heterocyclic nitrogen base, together with at least one sensitizing thiacarbocyanine dye.

7. A photographic gelatino-silver-halide emulsion containing a supersensitizing combination of at least one non-sensitizing heterocyclic nitrogen base containing an amino group, the nitrogen atom of which amino group is not one of the nuclear atoms in the heterocyclic ring of the heterocyclic nitrogen base, together with at least one sensitizing 2,2'-cyanine dye.

8. A photographic gelatino-silver-halide emulsion containing a supersensitizing combination of at least one non-sensitizing heterocyclic nitrogen base containing an amino group, the nitrogen atom of which amino group is not one of the nuclear atoms in the heterocyclic ring of the heterocyclic nitrogen base, together with at least one sensitizing dibenzothiacarbocyanine dye.

9. A photographic gelatino-silver-halide emulsion containing a supersensitizing combination of at least one non-sensitizing azole base containing an amino group, together with at least one sensitizing cyanine dye selected from the group consisting of 2'-cyanine dyes, 4'-cyanine dyes, 2'-pyridocyanine dyes, 4'-pyridocyanine dyes and α,α'-carbocyanine dyes.

10. A photographic gelatino-silver-halide emulsion containing a supersensitizing combination of at least one non-sensitizing thiazole base containing an amino group, together with at least one sensitizing cyanine dye selected from the group consisting of 2'-cyanine dyes, 4'-cyanine dyes, 2'-pyridocyanine dyes, 4'-pyridocyanine dyes and α,α'-carbocyanine dyes.

11. A photographic gelatino-silver-halide emulsion containing a supersensitizing combination of at least one non-sensitizing 6-dialkylaminobenzothiazole base, together with at least one sensitizing cyanine dye selected from the group consisting of 2'-cyanine dyes, 4'-cyanine dyes, 2'-pyridocyanine dyes, 4'-pyridocyanine dyes and α,α'-carbocyanine dyes.

12. A photographic gelatino-silver-halide emulsion containing a supersensitizing combination of at least one benzothiazole base containing a dialkylamino group together with at least one sensitizing thiacarbocyanine dye.

13. A photographic gelatino-silver-halide emulsion containing a supersensitizing combination of at least one benzothiazole base containing a dimethylamino group in the 6-position together with at least one sensitizing 2,2'-dialkyl-8-alkyl-thiacarbocyanine dye.

14. A photographic gelatino-silver-halide emulsion containing a supersensitizing combination of at least one non-sensitizing heterocyclic nitrogen base containing a dialkylamino group together with at least one sensitizing 2,2'-cyanine dye.

15. A photographic gelatino-silver-halide emulsion containing a supersensitizing combination of 6-dimethylaminoquinaldine together with at least one sensitizing 1,1'-diethyl-2,2'-cyanine dye.

16. A photographic gelatino-silver-halide emulsion containing a supersensitizing combination of at least one non-sensitizing quinoline base containing an amino group, together with at least one sensitizing cyanine dye selected from the group consisting of 2'-cyanine dyes, 4'-cyanine dyes, 2'-pyridocyanine dyes, 4'-pyridocyanine dyes and α,α'-carbocyanine dyes.

17. A photographic gelatino-silver-halide emulsion containing a supersensitizing combination of at least one non-sensitizing 6-dialkylaminoquinoline base, together with at least one sensitizing cyanine dye selected from the group consisting of 2'-cyanine dyes, 4'-cyanine dyes, 2'-pyridocyanine dyes, 4'-pyridocyanine dyes and α,α'-carbocyanine dyes.

18. A photographic gelatino-silver-halide emulsion containing a supersensitizing combination of at least one non-sensitizing quinoline base containing a dialkylamino group together with at least one sensitizing dibenzothiacarbocyanine dye.

19. A photographic gelatino-silver-halide emulsion containing a supersensitizing combination of 6-dimethylaminoquinaldine together with at least one sensitizing 2,2'-dialkyl-8-alkyl-3,4,3',4'-dibenzothiacarbocyanine dye.

BURT H. CARROLL.
EDWARD P. DAVEY.